United States Patent [19]

Patel

[11] Patent Number: 5,111,321
[45] Date of Patent: May 5, 1992

[54] DUAL-POLARIZATION LIQUID-CRYSTAL ETALON FILTER

[75] Inventor: Jayantilal S. Patel, Red Bank, N.J.

[73] Assignee: Bell Communications Research, Inc., Livingston, N.J.

[21] Appl. No.: 677,769

[22] Filed: Mar. 29, 1991

Related U.S. Application Data

[63] Continuation-in-part of Ser. No. 598,476, Oct. 16, 1990, and a continuation-in-part of Ser. No. 577,220, Aug. 31, 1990, Pat. No. 5,068,749.

[51] Int. Cl.$^5$ .................. G02F 1/1335; G02F 1/137; G01B 9/02
[52] U.S. Cl. ........................................ 359/92; 359/66; 359/93; 359/94
[58] Field of Search .............. 350/346, 347 V, 347 E; 356/352; 359/92, 94, 93, 66

[56] References Cited

U.S. PATENT DOCUMENTS

| | | | |
|---|---|---|---|
| 4,630,898 | 12/1986 | Jewell | 350/385 |
| 4,779,959 | 10/1988 | Saunders | 350/347 V |
| 4,790,634 | 12/1988 | Miller et al. | 350/3393 |

OTHER PUBLICATIONS

J. A. Patel et al., "Electrically tunable optical filter for infrared wavelength using liquid crystals in a Fabry-Perot etalon," Applied *Physics Letters*, 1990, vol. 57, pp. 1718–1720.

Primary Examiner—Stanley D. Miller
Assistant Examiner—Anita Pellman Gross
Attorney, Agent, or Firm—Leonard Charles Suchyta; Charles S. Guenzer

[57] ABSTRACT

A tunable dual-polarization liquid-crystal etalon filter, in which a Fabry-Perot cavity is set up between two end reflectors, preferably interference mirrors. A nematic liquid crystal fills a substantial portion of the Fabry-Perot cavity. The alignment layer adjacent to one end of the cavity is dividend into two portions, both of which are homogeneous but which are buffed in orthogonal directions so that they align the liquid crystal parallel to their surfaces but at orthogonal directions to each other. The other alignment layer is homeotropic so that it aligns the liquid crystal perpendicularly to its surface. Electrodes incorporated with each mirror apply a voltage across the liquid crystal so as to change the dielectric constant and thus the effective cavity length for radiation polarized along the alignment direction of the respective homogeneous portion. Because of the orthogonal buffing of the two homogeneous portions, they operate in equal amounts upon the two orthogonal polarizations. An input beam is divided between the two homogeneous portions. Preferably, both substrates upon which the filter is built are birefringent, e.g., calcite, so as to act as a polarization beam splitter and a recombiner.

10 Claims, 6 Drawing Sheets

DUAL-POLARIZATION LIQUID-CRYSTAL ETALON FILTER

RELATED APPLICATIONS

This is a continuation-in-part of Ser. No. 07/598,476, filed Oct. 16, 1990, and a continuation-in-part of Ser. No. 07/577,220, filed Aug. 31, 1990, now U.S. Pat. No. 5,068,749.

FIELD OF THE INVENTION

The invention relates generally to liquid crystals; the invention relates, in particular, to liquid-crystal filters and modulators.

BACKGROUND ART

The parent patent application, U.S. Ser. No. 07/598,476, describes a tunable liquid-crystal etalon filter comprising a liquid crystal filling a Fabry-Perot cavity defined on each end by dielectric interference mirrors. Electrodes are affixed to the outer surfaces of the interference mirrors. When voltage is applied across the electrodes, the effective dielectric constant of the liquid crystal is changed, thereby changing the optical length of the Fabry-Perot cavity and also changing the resonant frequency of the cavity. Accordingly, the filter selectively resonates and passes an optical frequency according to the applied electric field. Saunders had previously disclosed in U.S. Pat. No. 4,779,959 a liquid-crystal light modulator that uses metallic mirrors rather than interference mirrors. Because of the mirror losses, the transmission is relatively low and the resonances are relatively wide so that it can function not as a filter but only as a modulator for a well defined wavelength.

Many applications, particularly in a fiber-optic communication network, require that an optical filter be polarization-independent, that is, that the spectral characteristics of the filter be independent of the polarization of light being filtered. The grandparent application Ser. No. 07/577,220 discloses that polarization independence can be achieved if the liquid crystal is aligned to be parallel at each of the electrodes but is twisted an odd multiple of 90° between the electrodes. Although this approach has been demonstrated, it suffers from a relatively small spectral range over which it can be electrically tuned.

SUMMARY OF THE INVENTION

Accordingly, an object of the invention is to provide a polarization-independent liquid-crystal etalon filter or modulator.

A further object of the invention is to provide such a filter or modulator with a wide spectral tuning range.

The invention can be summarized as a liquid-crystal etalon filter or modulator comprising a liquid-crystal filling a Fabry-perot cavity defined between two end mirrors. One of the alignment layers at the ends of the cavity is a homogeneous aligning agent patterned into two areas aligning the liquid crystal in perpendicular directions within the plane of the alignment layer. The other alignment layer may be similarly patterned and homogeneous layer or preferably may be a uniform and homeotropic alignment layer aligning the liquid crystal perpendicularly to the alignment layer. An input light beam is divided between two areas of the liquid crystal so that both its polarization states are equivalently filtered. preferably, a birefringent crystal, such as calcite, is affixed to the input side of the filter so as to polarization divide the input beam to the lateral side of the filter with the corresponding polarization.

DETAILED DESCRIPTION OF THE PREFERRED EMBODIMENTS

Figure 1:
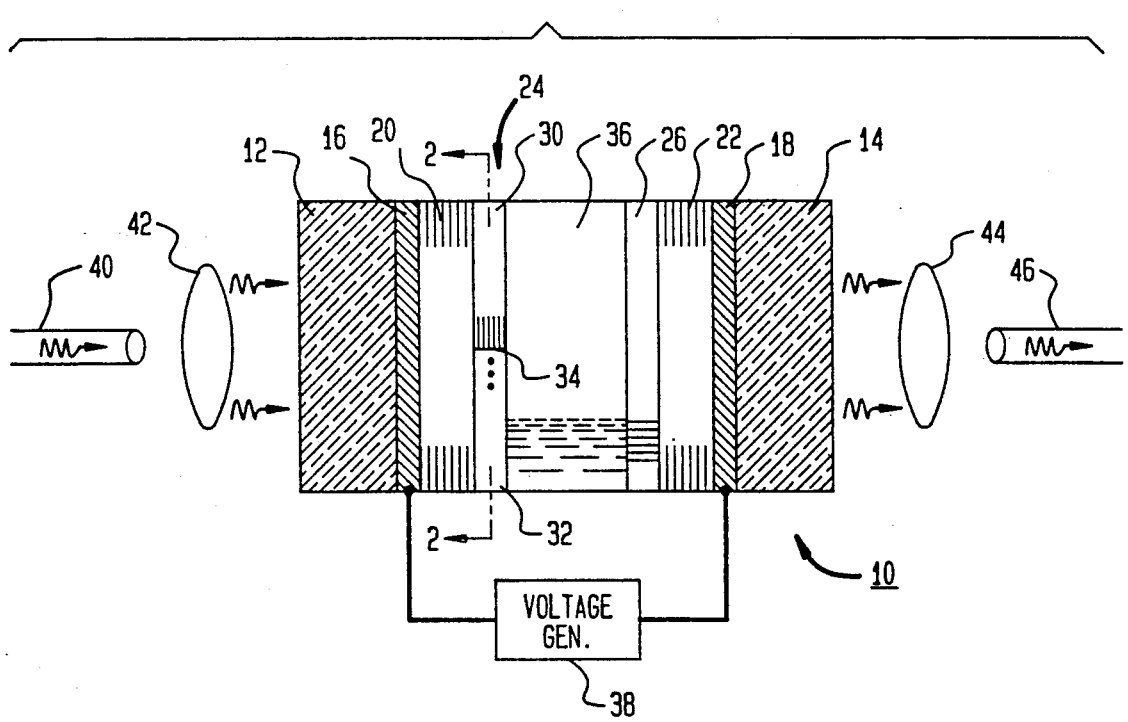
FIG. 1 is a cross-sectional view of a first embodiment of a liquid-crystal etalon filter of the present invention.

The parent patent application Ser. No. 07/598,476 describes a polarization-independent tunable liquid-crystal filter 10, as illustrated in cross-section in FIG. 1. Patel et al. provide a similar disclosure in "electrically tunable optical filter for infrared wavelength using liquid crystals in a Fabry-perot etalon," *Applied Physics Letters*, volume 57, 1990, pp. 1718–1720. The filter 10 is fabricated on two glass substrates 12 and 14, onto which are deposited transparent indium-tin-oxide electrodes 16 and 18. Dielectric stack mirrors 20 and 22 are formed on electrodes 16 and 18, and each consists of multiple pairs of quarter-wavelength thick layers of differing refractive indices to thereby act as interference mirrors for the wavelength of interest.

A homogeneous alignment layer 24 and a homeotropic alignment layer 26 are deposited and buffed on top of the respective stack mirrors 20 and 22. The alignment layers 24 and 26 cause liquid-crystal molecules disposed adjacent to the respective alignment layer to aligned in a particular direction. In particular, nematic liquid crystals are characterized by orientation order along the average direction of the long axes of the liquid-crystal molecules, called the director n. The alignment layers 24 and 26 establish the director n at the interface with the liquid crystal. The director n then varies smoothly in the liquid crystal between the two alignment layers 24 and 26. If an electrical field is applied across the liquid crystal, the director n becomes increasingly aligned with the electrical field in the gap between the alignment layers 24 and 26.

Figure 2:
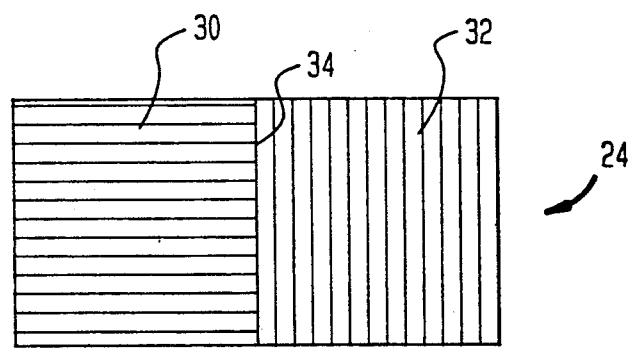
FIG. 2 is a plan view of a patterned alignment layer taken along sectional lines 2—2 of FIGS. 1 and 4.

According to the invention, the homogeneous alignment layer 24, as illustrated in plan view in FIG. 2, is divided into two portions 30 and 32 divided by an interface 34. Both portions 30 and 32 are formed of a homogeneous aligning agent, e.g., a nylon or polyester such as 1,4 polybutyleneterephathalate, that causes the director n at that point, and therefore the adjacent liquid-crystal molecules, to be aligned parallel to the surface of the alignment layer 24. However, the two portions 30 and 32 are buffed in perpendicular directions so that one homogeneous portion 30 aligns the liquid-crystal molecules perpendicular to the interface 34 while the other homogeneous portion 32 aligns them parallel to the interface 34. Details of the differential rubbing procedure are discussed in the parent application. On the other hand, the other alignment layer 26 if formed of a homeotropic aligning agent, e.g., octadecyltriethoxysilane, that causes the director n and the adjacent liquid-crystal molecules to be aligned perpendicularly to the surface of the alignment layer 26.

Following the formation of the critical alignment layers 24 and 26, the two substrates 12 and 14 are formed into an assembly having a gap between the two alignment layers of about 10 μm and a nematic liquid-crystal 36 is filled into the gap, all according to the procedure detailed in the parent application.

When a voltage generator 38 is connected between the electrodes 16 and 18, the applied electric field will cause a change in the effective refractive index in the liquid crystal 36 for light polarized in the direction of the director n, thus affecting the effective optical length of the Fabry-Perot cavity formed between the two mirrors 20 and 22. The direction of the director n transverse to the optical propagation is determined by the alignment direction of the homogeneous portion 30 or 32. The electric field, on the other hand, has no effect on the refractive index for light polarized in the direction perpendicular to the director direction. Thus, the change in effective refractive index depends strongly upon the polarization of the light. Because of the differential buffing directions in the alignment layer 24, light passing through the portion 30 will be affected only for its electrical polarization component that is perpendicular to the interface 34 while that passing through the portion 32 will be affected only for its electrical polarization component that is parallel to the interface 34. Because of the symmetry, both of the polarization components will be equally affected by the applied voltage as they pass through the respective portions 30 and 32 and the corresponding portions of the liquid crystal 36.

The tunable liquid-crystal etalon filter 10 can be used by optically aligning an input optical fiber 40 with the interface 34 of the homogeneous alignment layer 24. A rod graded-index lens 42, represented functionally in FIG. 1, disperses the beam so that equal amounts of optical energy fall upon the two portions 30 and 32. On the output side, a corresponding lens 44 recombines the filtered light onto an output fiber 46.

EXAMPLE 1

A dual-polarization liquid-crystal etalon filter 10 was fabricated according to the above procedure. It had a cell gap of 10 μm. Its lateral dimensions were 1 cm × 1 cm. Poly 1,4 butyleneterephathalate and octadecyltriethoxysilane were used as the aligning agents. The nematic liquid crystal was E7, available from EM of Hawthorne, N.Y. The liquid crystal was filled while in its isotropic state into the cell gap of 10 μm using a vacuum filling technique. The alignment layers cannot absolutely determined the alignment direction of the liquid crystal molecules since there is a degeneracy between the parallel and antiparallel directions in the homogeneous aligning agent, which would likely result in the formation of multiple domains in each of the homogeneous portions 30 and 32. Multiple domains can be avoided by breaking the symmetry using finite tilt angles at the homogeneous alignment layer 24. However, in the example, a single domain was obtained in each of the homogeneous portions 30 and 32 by filling the gap with liquid crystal 36 while in its isotropic phase and then cooling it while an electric field is applied across it by the electrodes 15 and 18.

Figure 3:
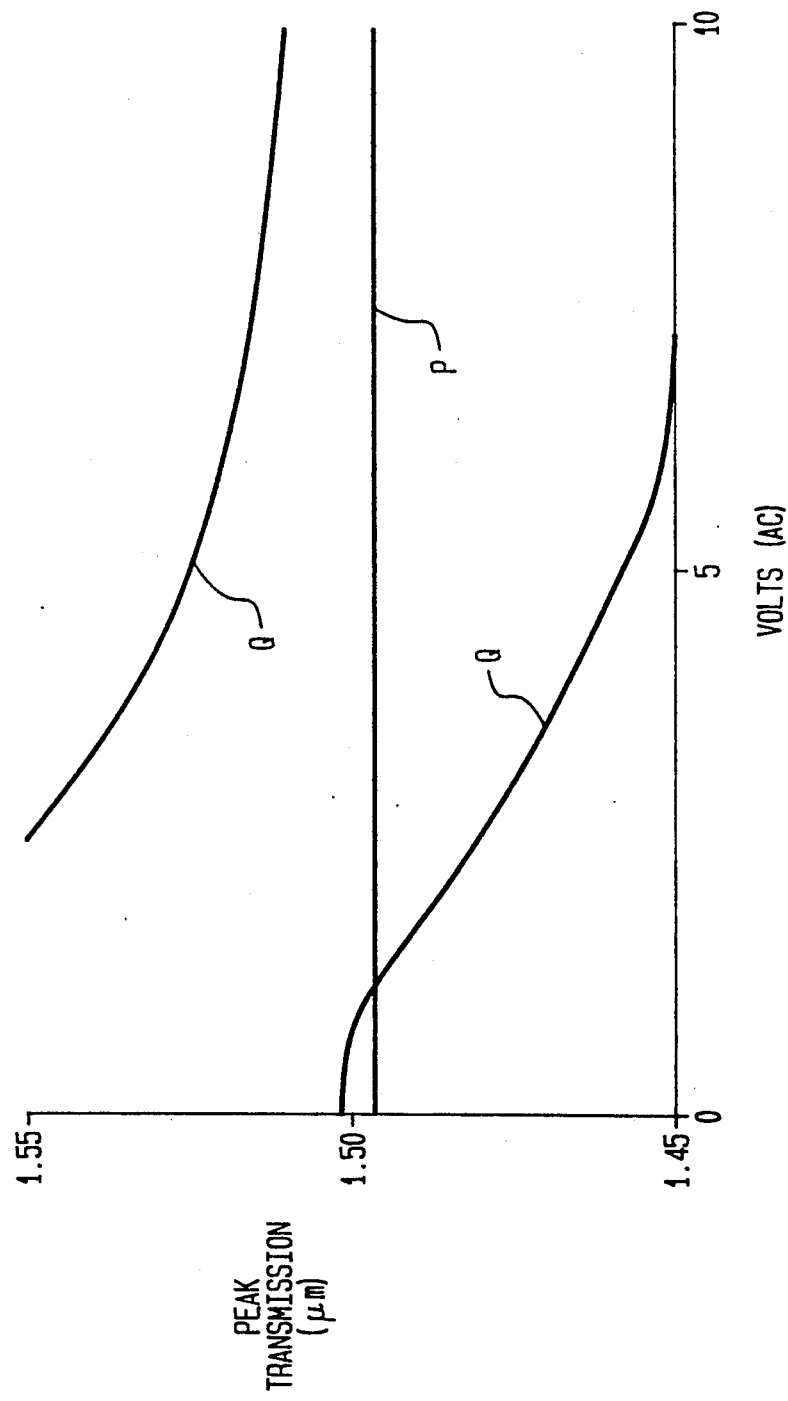
FIG. 3 is a illustration of the transmission wavelength as a function of voltage for an example of the invention.

The device was characterized at room temperature using an optical spectrum analyzer, a 1.5 μm light emitting diode as a light source, and multi-mode optical fibers. The multi-mode fiber and graded-index rod lens produces a highly collimated with having a diameter of about 400 μm. Use of a single-mode fiber produced a beam diameter of about 250 μm. A programmable and computer-controlled voltage source provided a square wave potential at 1 kHz. The spectral location for the maxima of the transmission peaks are illustrated in the graph of FIG. 3 as a function of the applied voltage. The transmission peaks had widths or pass bands of about 0.9 nm. The transmission spectra show two bands P and Q. The P band does not change with voltage and corresponds to polarization perpendicular to the director n. The Q band, however, does change significantly with voltage. It corresponds to polarization parallel to the director n. The position of the P band is determined by the resonance condition.

$$m\lambda = n_s d,$$

where m is the mode number, λ is the optical wavelength, $n_s$ is the refractive index along the short axis of the liquid crystal, and d is the physical thickness of the Fabry-Perot cavity. The applied voltage changes $n_s$ by about 12%. The figure shows a tuning range of about 100 nm and a free spectral range of about 70 nm for the Q peak. The spectra were remeasured with a polarizer inserted on the input side. Both when the light was polarized perpendicular to the interface 34 and when parallel to the interface 34, the spectra did not differ significantly from those of FIG. 3.

Because the P band is not tunably filtered, the filter needs to be designed with the desired free spectral range avoiding this band.

The filter of FIG. 1 suffers the disadvantage that there is a 3 dB loss associated with the unfiltered polarization or P band. That is, the lens 42 distributes equal amounts of both optical polarizations to the two portions 30 and 32. However, in each portion 30 or 32, only that polarization corresponding to the buffing direction is selected accorded to the wavelength. The other polarization is not affected by the applied field and is thus necessarily blocked.

A general method of avoiding this 3 dB loss is to recognize that the lens 42 acts as a spatial beam splitter that is polarization insensitive. There are many well known types of polarization beam splitters which separate an input beam into two output beams according to the polarization, for example, a Wollaston prism. Such a polarization beam splitter would receive light from the input optical fiber 40 and deliver the respective polarization components to the respective portions 30 and 32 which filter that polarization.

Figure 4:
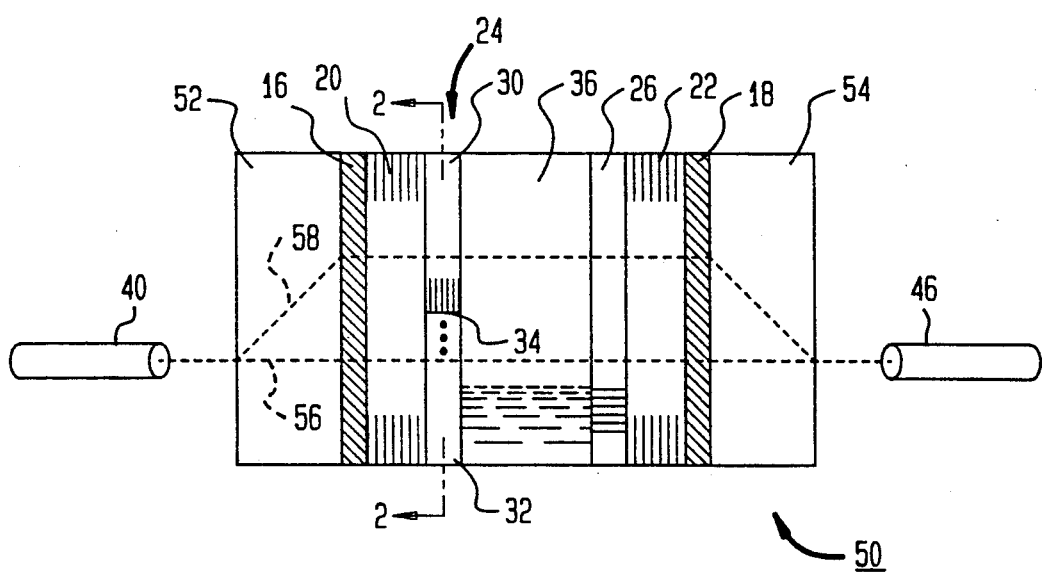
FIG. 4 is a cross-sectional of a second embodiment of the invention.

A particularly advantageous tunable dual-polarization liquid-crystal etalon filter 50 using a polarization beam splitter, as illustrated in the cross-sectional view of FIG. 4, is fabricated on substrates 52 and 54 of birefringent material which divides a beam according to its polarization state. On the input side, the birefringent substrate 52 splits the beam from the input fiber into an ordinary beam 56 and an extraordinary beam 58. If the birefringent optical axis is set perpendicularly to the long axis of the interface 34 of the homogeneous alignment layer 24 and preferably at 45° to the input optical axis, the ordinary beam 56 is undeflected while the extraordinary beam 58 is deflected. The light in the ordinary beam 56 is electrically polarized parallel to the interface 34 while that in the extraordinary beam 58 is polarized perpendicularly to it. At the interface between the birefringent substrate 52 and the transparent electrode 16, the two beams 56 and 58 return to their original directions and pass through the two portions 30 and 32 respectively containing the homogeneous aligning agent of the proper alignment. Importantly, the two beams 56 and 58 are well separated at this point so that the diameter and alignment of the input beam are not critical. After passing through the liquid crystal 36, the two beams are recombined by the other birefringent substrate 54 set with its birefringent optical axis set to mirror that of the first birefringent substrate 52. Although a non-polarization beam combiner could be used instead, the two birefringent substrates 52 and 54 are easily matched and provide an integrated assembly. Rather than using birefringent substrates, birefringen layers can be permanently fixed on glass substrates. The liquid-crystal dual-polarization filter 50 avoids the 3 dB loss because all of the polarization component is delivered to that portion 30 or 32 that can completely filter it. This filter 50 has the further advantage that the P band is eliminated. If a broad-area photodetector is used, the birefringent layer 54 on the output side is not needed.

EXAMPLE 2

The design of the integrated dual-polarization liquid-crystal filter with polarization beam splitters and combiners was verified by clamping calcite plates of 4 mm thicknesses to the outsides of the soda-lime glass substrates 12 and 14 of the dual-polarization liquid-crystal filter 10 of Example 1. The filter was tested by inputting a beam from a laser and detecting its output. When a manually operated polarization controller rotated the polarization direction of the input light, the output intensity varied by less than 1 dB. On the other hand, when a polarizing sheet was additionally inserted across the input beam, the polarization controller produced 25 dB variations of the output intensity.

Figure 6:
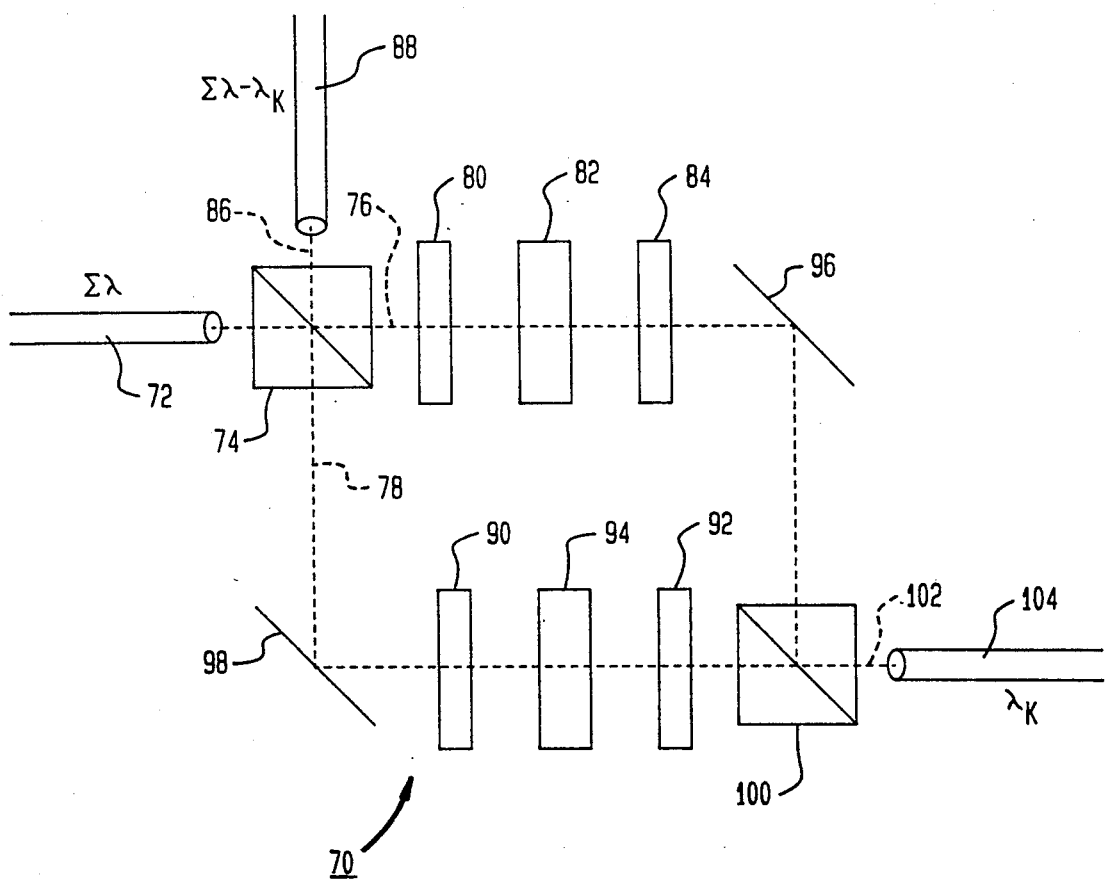
FIG. 6 is a schematic illustration of an optical drop circuit using the polarization diversity filter of the invention.

Because the dual polarization filter 50 of FIG. 4 is insensitive to polarization, it can be advantageously used in an optical drop circuit. Wavelength division multiplexing (WDM) communication systems impress multiple optical signals at wavelengths $\lambda_1 \ldots \lambda_N$ on a single optical fiber. The N-fold optical signal will be represented as $\Sigma\lambda$. Various types of filters can be used to select the channel $\lambda_k$ from the N channels of $\Sigma\lambda$. However, a simple filter will discard the other N−1 channels. The optical equivalent of an electronic drop circuit would be advantageous in which the $\lambda_k$ channel is removed from the fiber but the other N−1 channels remain on the fiber. An optical drop circuit 70 illustrated in FIG. 6 performs such a function.

An input fiber carries the WDM signal $\Sigma\lambda$, which is divided by a first polarization beam splitter 74 into a first beam 76 and a second beam 78. The illustrated type of polarization beam splitter 74 is a cube of quartz split along a diagonal to form a planar interface. The interface is covered with one or more dielectric layer, and the cube is assembled. Light polarized parallel to the interface is reflected at 90° while the orthogonal polarization is transmitted. The first beam 76 initially carries the polarization components of the WDM signal that are polarized within the plane of the illustration while the second beam 78 carries the orthogonally polarized components. When the first beam 76 passes through a quarter-wave plate 80, all its frequency components become circularly polarized. The circularly polarized beam 76 is incident on a first liquid-crystal dual-polarization filter 82 having the structure of the filter 50 of FIG. 4 and tuned to the selected wavelength $\lambda_k$. The filter 82 spatially splits the circularly polarized first beam 76 into its two linearly polarized components, passes both linearly polarized components at $\lambda_k$, and recombines the $\lambda_k$ components into a circularly polarized beam. Another quarter-wave plate 84 converts the circularly polarized $\lambda_k$ channel to the linear polarization perpendicular to the original polarization, that is, perpendicular to the illustration.

The other N−1 optical channels $\Sigma\lambda - \lambda_k$ which do not pass the filter 82 are reflected with minimal loss of energy. Upon their reverse passage through the first quarter-wave plate 80, they become linearly polarized but perpendicularly to their original polarization. Therefore, the polarization beam splitter 74 reflects them to an unselected output beam 86 received by an output fiber 88.

The quarter-wave plates 80 and 84 can be replaced by magneto-optical devices that rotate the linear polarization of a light beam by 45° and rotate by the same angle when the beam travels in the reverse direction, that is, a 90° rotation for a double passage. Thereby, equal amounts of the two polarizations are presented to the filter 82, and the polarization beam splitter 74 directs the reflected beam away from the input beam. The second magneto-optical device reestablishes the original polarization direction, if this is required.

The structure described so far would operate as an optical drop circuit if the linear polarization of the WDM signal could be controlled. However, to compensate for a lack of such control, similar quarter-wave plates 90 and 92 and dual-polarization filter 94 are needed to perform similar filtering and reflection of the orthogonally polarized components in the second beam 78. The reflected components have their linear polarization rotated so that they pass through the first polarization beam splitter 74 to the output fiber 88. That is, the beam splitter 74 also acts as a combiner of the two linearly polarized components of the unselected signal $\Sigma\lambda - \lambda_k$. Mirrors 96 and 98 bring the two polarization components of the selected channel $\lambda_k$ to a second polarization beam splitter 100, which combines them into a selected output beam 102 received by another output fiber 104. Regardless of the polarization state of the input channels $\Sigma\lambda$, the drop circuit 70 performs the same selection into the selected output beam 102 and the same reflection into the unselected output beam 86.

Figure 5:
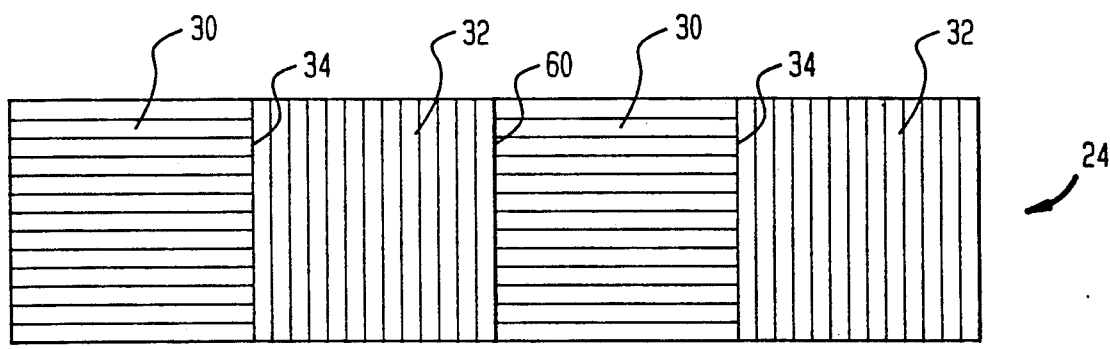
FIG. 5 is a plan view of an arrayed alignment layer taken along sectional lines 2—2 of FIGS. 1 and 4.

In one array embodiment illustrated in plan view in FIG. 5, the homogeneous alignment layer 24 is divided into a plurality of orthogonally buffed homogeneous portions 30 and 32. The dual-polarization filter 10 of FIG. 1, when combined with the array of FIG. 5, can filter three beams at the interfaces 34 and 60. However, the dual-polarization filter 50 of FIG. 4 can filter only two beams at the equivalent interfaces 34. In another array embodiment, the multiple beams are arrayed along the interface 34 between the two alignment layer portions 30 and 32. One electrode 16 or 18 is patterned to provide separate electrodes for the beams.

Although the above embodiments provide a filter having a narrow enough tunable pass band so as to separate out a portion of a wide spectrum, the invention is equally applicable to a modulator having a relatively wide but tunable pass band. For instance, the mirrors may be metallic, as disclosed by Saunders above, and combined with the electrodes. For purposes of this application, a modulator will be considered as a special case of a filter.

In the above embodiments, the homogeneous alignment layer was buffed parallel and perpendicular to the interface 34 between the two homogeneous portions 30 and 32. However, the dual-polarization effect can be obtained for orthogonal buffing at different angles with respect to the interface. The embodiments described above used a uniform homogeneous aligning agent in the second alignment layer 20. However, the same effect can be obtained if the second alignment layer is formed of a homeotropic aligning agent that is patterned similarly to the first alignment layer. Then, the two alignment layers need to be precisely assembled so that their respective interfaces 34 are aligned. The homogeneous aligning agent can be aligned in parallel between the two alignment layers or aligned perpendicularly so as to impart a 90° twist to the liquid crystal across the gap.

The invention thus provides an electrically tunable polarization-independent narrow-bandwidth filter. It can be inexpensively fabricated and easily operated.

What is claimed is:

1. A dual-polarization liquid-crystal etalon filter comprising:
    a first substrate having formed thereon a first mirror, a first electrode, and a first alignment layer, said first alignment layer being comprised of a homogeneous aligning agent and being divided into first and second portions separated by an interface, said first portion aligning an adjacent liquid crystal in a first direction substantially parallel to a surface of said first portion, said second portion aligning an adjacent liquid crystal in a second direction substantially parallel to a surface of said second portion and substantially perpendicular to said first direction;
    a second substrate having formed thereon a second mirror, a second electrode, and a second alignment layer for aligning an adjacent liquid crystal in one or more predetermined directions, said first and second substrates being assembled together with said first and second alignment layers facing each other and with a predetermined gap therebetween, wherein at least one of said substrates comprises a layer of a birefringent material; and
    a liquid crystal filling said gap.

2. A filter as recited in claim 1, wherein both of said substrates comprise respective ones of said layers of said birefringent material, said first and second substrates being set so that a first one of said layers of said birefringent material divides an input beam into two parts and a second one of said layers of said birefringent material recombines said two parts into an output beam.

3. An optical drop circuit including the dual-polarization liquid-crystal etalon filter recited in claim 1, wherein said mirrors comprise interference mirrors and further comprising:
    a polarization beam splitter receiving an input beam and outputting along an optical axis a polarization component of said input beam, said filter of claim 4 being disposed along said optical axis; and
    polarization converting means disposed between said splitter and said filter, whereby, when said filter is tuned to select a frequency component of said input beam, unselected frequency components are reflected by said filter and said polarization beam splitter outputs said unselected frequency components along an unselected beam direction different from an optical axis of said input beam.

4. A filter as recited in claim 1, wherein said at least one substrate consists of said layer of birefringent material.

5. A filter as recited in claim 1, wherein each of said first and second portions of said first alignment layer aligns said adjacent liquid crystal into only a single liquid-crystal domain.

6. A dual-polarization liquid-crystal etalon filter, comprising:
    a first substrate having formed thereon a first mirror, a first electrode, and a first alignment layer, said first alignment layer being comprised of a homogeneous aligning agent and being divided into first and second portions separated by an interface, said first portion aligning an adjacent liquid crystal in a first direction substantially parallel to a surface of said first portion, said second portion aligning an adjacent liquid crystal in a second direction substantially parallel to a surface of said second portion and substantially perpendicular to said first direction;
    a second substrate having formed thereon a second mirror, a second electrode, and a second alignment layer for aligning an adjacent liquid crystal in one or more predetermined directions, said first and second substrates being assembled together with said first and second alignment layers facing each other and with a predetermined gap therebetween;
    a liquid crystal filling said gap; and
    polarization optical means for delivering first and second polarization components of an input beam to said first and second portions respectively.

7. A filter as recited in claim 6, wherein said polarization optical means comprises a layer of birefringent material fixed to one of said substrates.

8. A dual-polarization liquid-crystal etalon filter, comprising:
    a first substrate having formed thereon a first mirror, a first electrode, and a first alignment layer, said first alignment layer being comprised of a homogeneous aligning agent and being divided into first and second portions separated by an interface, said first portion aligning an adjacent liquid crystal in a first direction substantially parallel to a surface of said first portion, said second portion aligning an adjacent liquid crystal in a second direction substantially parallel to a surface of said second portion and substantially perpendicular to said first direction;
    a second substrate having formed thereon a second mirror, a second electrode, and a second alignment layer for aligning an adjacent liquid crystal in one or more predetermined directions, said first and second substrates being assembled together with said first and second alignment layers facing each other and with a predetermined gap therebetween;
    a liquid crystal filling said gap; and
    optical means for distributing substantially equal portions of an input beam over said first and second portions.

9. An optical dropper, comprising:
    a first polarization beam splitter receiving an input beam and outputting to a first optical path a first polarization component of said input beam, said polarization beam splitter outputting a second polarization component orthogonal to said first polarization component that is received from said first optical path to an unselected optical path offset from an optical axis of said input beam;

an electrically tunable, polarization-insensitive liquid-crystal etalon filter comprising two interference mirrors defining an optical cavity of said filter and disposed on said first optical path; and first polarization converting means disposed on said first optical path between said splitter and said filter.

10. An optical dropper as recited in claim 9, wherein said first polarization beam splitter outputs said second polarization component of said input beam along a second optical path and further comprising:

a second electrically tunable, polarization-insensitive liquid-crystal etalon filter comprising two interference mirrors defining an optical cavity of said second filter and disposed on said second optical path;

second polarization converting means disposed on said second optical path between said first splitter and said second filter; and;

a polarization beam combiner disposed on said first and second optical paths.

* * * * *

UNITED STATES PATENT AND TRADEMARK OFFICE
CERTIFICATE OF CORRECTION

PATENT NO. : 5,111,321

DATED : May 5, 1992

INVENTOR(S) : Jayantilal S. Patel

It is certified that error appears in the above-identified patent and that said Letters Patent is hereby corrected as shown below:

Column 1, line 57, "Fabry-perot" should read --Fabry-Perot--;
         line 68, "preferably" should read --Preferably--.
Column 2, line 25, "electrically" should read --Electrically--;
         line 28, "Fabry-perot" should read --Fabry-Perot--;
         line 68, "if" should read --is--.
Column 3, line 54, "determined" should read --determine--.

Signed and Sealed this

Twenty-ninth Day of June, 1993

Attest:

MICHAEL K. KIRK

*Attesting Officer*      *Acting Commissioner of Patents and Trademarks*